US010235867B2

United States Patent
Maharaj

(10) Patent No.: US 10,235,867 B2
(45) Date of Patent: Mar. 19, 2019

(54) PERSONAL SECURITY REAR VIEW MIRROR

(71) Applicant: DMYK INVENTIONS INC., Surrey (CA)

(72) Inventor: Damien Maharaj, Surrey (CA)

(73) Assignee: DMYK INVENTIONS INC. (CA)

( * ) Notice: Subject to any disclaimer, the term of this patent is extended or adjusted under 35 U.S.C. 154(b) by 0 days.

(21) Appl. No.: 15/769,965

(22) PCT Filed: Oct. 4, 2017

(86) PCT No.: PCT/CA2017/000220
§ 371 (c)(1),
(2) Date: Apr. 20, 2018

(87) PCT Pub. No.: WO2018/064748
PCT Pub. Date: Apr. 12, 2018

(65) Prior Publication Data
US 2018/0308343 A1    Oct. 25, 2018

Related U.S. Application Data

(60) Provisional application No. 62/403,957, filed on Oct. 4, 2016.

(51) Int. Cl.
*G02B 5/10*    (2006.01)
*G08B 25/01*    (2006.01)

(52) U.S. Cl.
CPC .............. *G08B 25/016* (2013.01); *G02B 5/10* (2013.01)

(58) Field of Classification Search
None
See application file for complete search history.

(56) References Cited

U.S. PATENT DOCUMENTS

| | | | |
|---|---|---|---|
| 4,716,402 A | 12/1987 | Francis | |
| 6,420,975 B1* | 7/2002 | DeLine | ..................... B60R 1/12 340/425.5 |
| 8,031,078 B1 | 10/2011 | Liestman | |
| 2004/0201474 A1 | 10/2004 | Vladovich | |
| 2006/0033597 A1* | 2/2006 | Wells | ................. G08B 21/0297 333/204 |
| 2007/0200716 A1 | 8/2007 | Haase | |

(Continued)

OTHER PUBLICATIONS

Lionheart, iPhone 5s Home Button Replacement, Apr. 1, 2015, IFIXIT.com, https://www.ifixit.com/Guide/iPhone+5s+Home+Button+Replacement/24983, Internet Archive Wayback Machine: https://web.archive.org/web/20150401124348/https://www.ifixit.com/Guide/iPhone+5s+Home+Button+Replacement/24983 (Year: 2015).*

(Continued)

*Primary Examiner* — Carlos Garcia
(74) *Attorney, Agent, or Firm* — Baumgartner Patent Law; Marc Baumgartner

(57) ABSTRACT

A low power, battery operated wall or surface mountable personal safety device equipped with a convex mirror and an audible alarm. The device is for alerting a user to anyone approaching from beside or behind, and allows them to trigger the audible alarm when they feel threatened. The device may also be equipped to send a signal to a central processor to identify and record the location and time of the alarm activation.

14 Claims, 8 Drawing Sheets

(56) References Cited

U.S. PATENT DOCUMENTS

| | | | |
|---|---|---|---|
| 2007/0241922 A1 | 10/2007 | Brannon | |
| 2008/0227480 A1* | 9/2008 | Cho .................... | H01H 13/704 |
| | | | 455/550.1 |
| 2010/0207842 A1* | 8/2010 | Kawaguchi ........... | C23C 14/205 |
| | | | 343/907 |
| 2011/0273356 A1* | 11/2011 | Kawaguchi ......... | C23C 14/0015 |
| | | | 343/873 |
| 2014/0125463 A1* | 5/2014 | Carmen, Jr. ........ | F21V 33/0052 |
| | | | 340/12.5 |
| 2014/0133042 A1 | 5/2014 | Bird | |
| 2014/0152596 A1* | 6/2014 | Park ..................... | G06F 1/1626 |
| | | | 345/173 |
| 2015/0018101 A1* | 1/2015 | Schoenith ............... | A63F 13/98 |
| | | | 463/37 |
| 2015/0059251 A1* | 3/2015 | Rinner .................. | G06F 1/1656 |
| | | | 49/465 |
| 2015/0153886 A1* | 6/2015 | Hunt ...................... | G06F 3/017 |
| | | | 345/174 |
| 2016/0367193 A1* | 12/2016 | Zhang ................... | A61B 5/021 |
| 2018/0096547 A1* | 4/2018 | Robertson .............. | G06F 21/34 |

OTHER PUBLICATIONS

Energizer—Cabinet LightTap LED lights2 Pack, 2018, Target.com, https://www.target.com/p/energizer-cabinet-lighttap-led-lights2-pack/-/A-14786919 (Year: 2018).*

PCT, International Search Report and Written Opinion dated Jan. 16, 2018 in International Patent Application No. PCT/CA2017/000220, 10 Pages.

* cited by examiner

PERSONAL SECURITY REAR VIEW MIRROR

CROSS REFERENCE TO RELATED APPLICATIONS

The present invention is filed under 35 U.S.C. § 371 as the U.S. national phase of International Application No. PCT/CA2017/000220, filed Oct. 4, 2017, which designated the U.S. and claims the benefit of U.S. Provisional Application Ser. No. 62/403,957, filed Oct. 4, 2016, entitled PERSONAL SECURITY REAR VIEW MIRROR, each of which is hereby incorporated in its entirety including all tables, figures and claims.

FIELD

The present technology is an integrated combination of a pressure sensitive alarm and mirror that includes a convex surface. More specifically, it is a mirror that is able to alert a user of a potential attacker approaching from behind that when pressed, emits an audible signal.

BACKGROUND

There are a number of situations and locations in which a person is put at risk because they are involved in an activity that, even if just for a moment, requires that they look forward and not check over their shoulder. These include men urinating in a public washroom and people unlocking house or apartment doors. Should the person be attacked or feel threatened, they can use a security device to scare the attacker or alert a passerby, or both.

For example, U.S. Publication No. 20070200716, discloses a personal safety alarm device that is of specific applicability to children. The personal safety alarm is integrated into a watch to be worn by a child. This can be used if the child is feeling threatened or is scared. It does not provide a view of what is happening behind them.

U.S. Pat. No. 8,031,078 discloses a key chain holder with clock and audible alarm. The invention includes a housing that contains the alarm, which is actuated by a spring-loaded trigger. The spring-loaded trigger requires at least 5 pounds of pressure in order to set off the alarm. The invention also includes a hand strap and flash light. The clock displays the time and date. Similarly, this can be used if the user feels threatened or scared. It does not provide a view of what is happening behind them.

A device that allows the user to see what is happening behind them is disclosed in U.S. Publication No. 20140133042, which is directed to a convex mirrored surface encased in a housing, which is further attached to a slap band strap. The slap band strap is highly reflective. The mirrored can also display other information, lights or alarms (specifically time-associated alarms), etc. All surfaces are capable of displaying emergency information, logos, messages, or advertising. While this invention allows a user to be cognizant of activities around them, it does not provide an alarm to scare off potential attackers or to alert others.

What is needed is a device that can allow the user to see what is happening around them, and more specifically, what is happening beside and behind them. The device should further include an alarm system that can easily be activated. The device would preferably be battery operated. Accordingly, the device would preferably draw very little power. It would be still preferable if the device was an integrated convex mirror and alarm. The alarm would preferably be activated by pressure. More preferably, the force of a human hand or part of a hand should be sufficient to activate the alarm. The alarm would preferably be an audible alarm. It would be more preferable if the device could send a signal to a central processor that could identify the location of the activated alarm and the time of activation. It would be still more preferable if the processor was instructed by a memory to record the time and location of the activation.

SUMMARY

The present technology provides a device that can allow the user to see what is happening around them, and more specifically, what is happening beside and behind them. The device includes an alarm system that can easily be activated. The device is battery operated. Accordingly, the device draws very little power. The device is an integrated convex mirror and alarm.

The alarm is easily activated with pressure. The force of a human hand or part of a hand is sufficient to activate the alarm. The alarm is an audible alarm. As part of a system, the device sends a signal to a central processor that identifies the location of the activated alarm and the time of activation. The memory records the time and location of the activation.

In one embodiment, a personal security device for mounting on a surface and for use with a power supply is provided, the device comprising: i) a body, the body including: an exterior ring; a button, which includes a reflective convex surface on at least a portion of the button and a button shell, the button shell in slidable engagement with the exterior ring; a backing plate, the backing plate abutting the exterior ring; and a wall mount plate, which is releasably attached to the backing plate and the exterior ring; ii) an interior, which is defined by the button and the backing plate, the interior including a first inner surface defined by the backing plate and a second inner surface defined by the button; iii) at least one biasing member, which extends between the first inner surface and the second inner surface; iv) a pressure sensitive audible alarm mechanism, the alarm mechanism including a pressure sensor, the pressure sensor located in the interior, in a contact distance of the button, which is biased from the pressure sensor with the biasing member; and v) an audible alarm, the audible alarm in communication with the pressure sensor.

In the device, the audible alarm may be remote to the body and in wireless communication with the pressure sensor.

In the device, the audible alarm may be housed in the interior and the device may further comprises a plurality of sound apertures.

In the device, the pressure sensitive audible alarm mechanism may be a sensor-alarm circuit that includes a piezo-sensor and a piezo-sounder, the piezo-sensor in electrical communication with the piezo-sounder.

In the device, the backing plate may include at least two twist lock slots and the wall mount may include at least two twist lock protrusions, the twist lock protrusions in releasable engagement with the twist lock slots.

The device may further comprise a tab, the tab releasably retained in the exterior ring and retained in the wall mount to releasably retain the exterior ring and the button.

In another embodiment, a security system for monitoring personal safety of users is provided, the system comprising: i) a plurality of personal safety devices, the personal safety devices each including: a body including a front which includes a reflective surface, a back and a side wall therebetween, the front biased from the back and slidably engaged in the side wall; an interior defined by the front, the back and the sidewall, a sensor-alarm circuit, the sensor alarm circuit housed in the interior on the back in contact distance with the front; ii) a processor with a memory; and iii) electronic or radio communication channels between the processor and the sensor-alarm circuit.

In the system, the memory may include a map for locating a site of an activated alarm.

In the system, the processor may include a clock for determining a time of an alarm activation.

In another embodiment, a use of the device described above may be for personal protection.

In another embodiment, a method of personal protection may use the system described above.

The method may further comprise storing data on a location and a time of activation of an alarm.

The method may further comprise analyzing data to determine problem times and locations.

FIGURES

DESCRIPTION

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

A contact distance—in the context of the present technology, a contact distance is one that allows a pressure sensor to be activated when a user presses on the part that will touch it, directly or indirectly and to be not activated when a user is not pressing.

DETAILED DESCRIPTION

Figure 1:
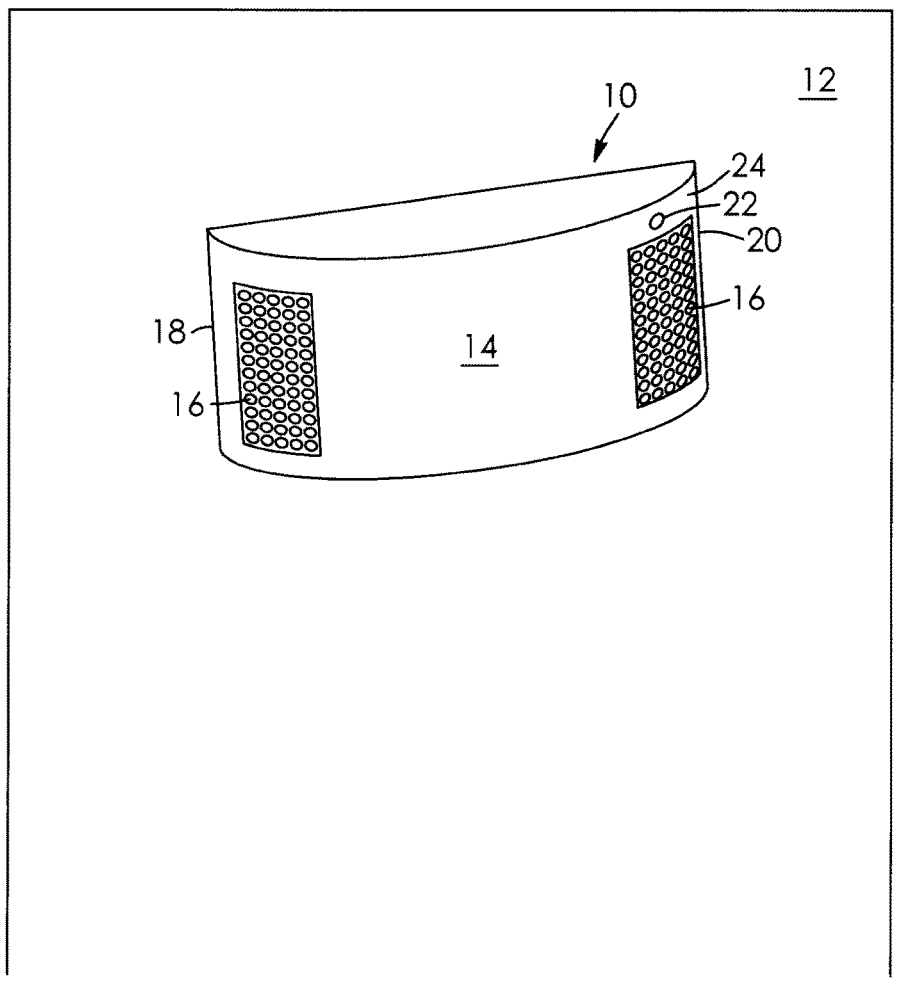
FIG. 1 is a perspective view of the integrated security device of the present technology.

An integrated security device, generally referred to as 10 is shown in FIG. 1. The device 10 is for mounting on a wall or other surface 12. It can be seen that the device has a convex surface 14. This surface 14 is reflective and therefore functions as a mirror. A plurality of sound apertures 16 are proximate each of a first side 18 and a second side 20. A small light 22, which is preferably a light emitting diode (LED) is located in an upper quadrant 24 of the surface 14.

Figure 2:
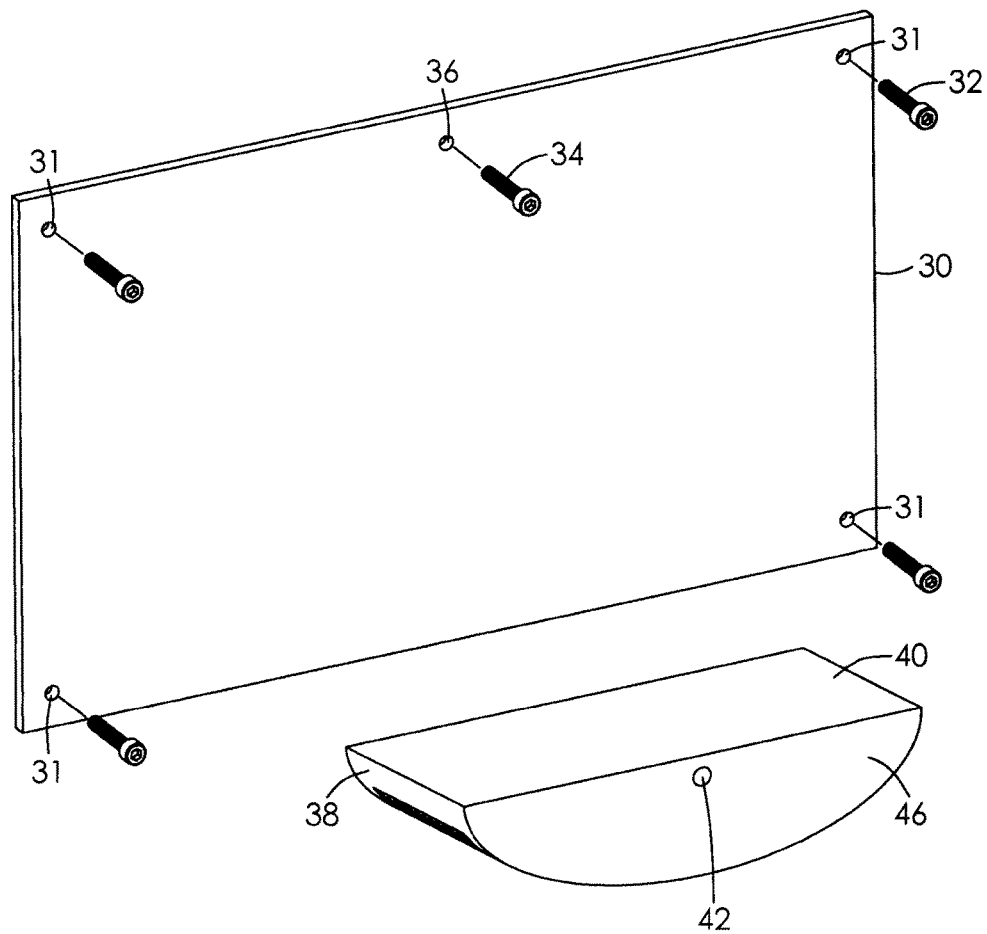
FIG. 2 is an exploded view of the device of FIG. 1.

As shown in FIG. 2, the device 10 is releasably affixed to the wall 12 with a holder 30. The holder 30 is retained on the wall 12 with screws 32 that extend through screw apertures 31 in the holder 30. A small set screw 34 releasably retains the device 10 to the holder 30, hence the holder 30 has a threaded aperture 36 to accept the set screw 34 and the device 10 has a set screw aperture 42. Note that clips, latches and other releasable closures can replace the set screw and set screw aperture as would be known to one skilled in the art.

Figure 3A:
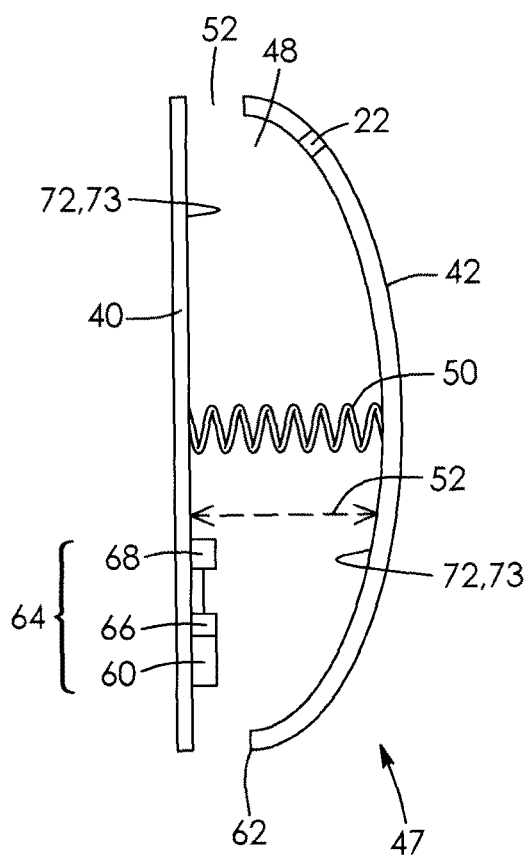
FIG. 3A is a longitudinal sectional view through a convex mirror of the present technology.

The device has a back 40, a front 38, and depending upon the shape of the mirror (fully convex, convex front only), may have a top 44 (see FIG. 7) and a bottom 46, as well as the front 38 to define a body, generally referred to as 47 (see FIG. 3A).

Figure 3B:
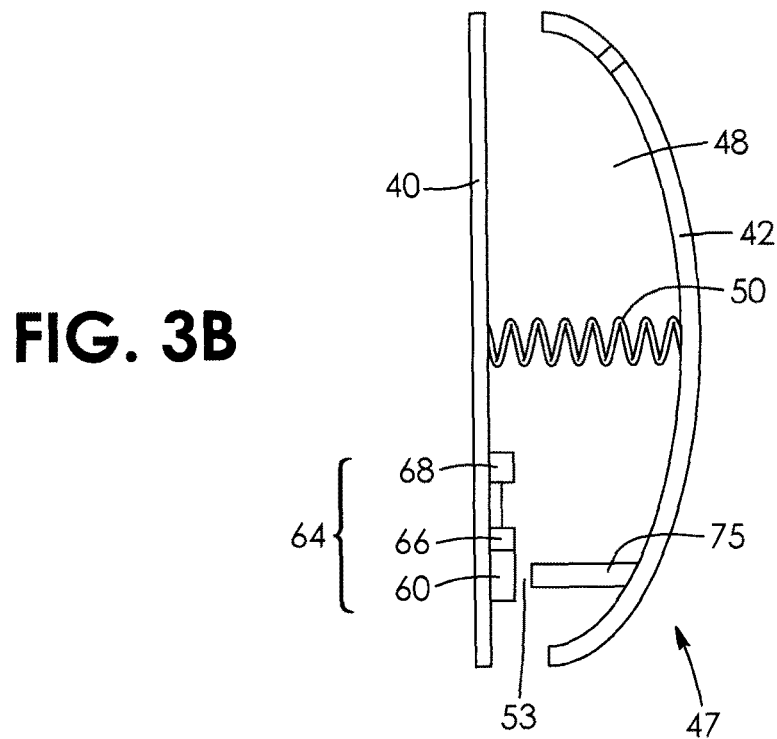
FIG. 3B is a longitudinal sectional view through an alternative embodiment of FIG. 3A.

As shown in FIG. 3A, these two or four parts define an interior 48. The front 38 is biased from the back 40 with a spring 50 or other suitable resilient member that holds the front 38 off the back 40 to provide a space 52 between the front 38 and back 40. A pressure sensor element 60, which is preferably a piezo-ceramic wafer is located on a first inner surface 72 of the interior 48 or a second inner surface 73 of the interior, (which may be the inner surface of the back 40 or the inner surface of the front 38) in the space 52 between the front 38 and the back 40. As shown in FIG. 3B, the space 52 allows the pressure sensor 60 to be in a contact distance 53 with the surface 72, 73 (which may include an extension or stub 75) which will press upon it when a user presses on the front 38 or body 47. As shown in FIG. 3A, this space 52 may alternatively be aligned with the edge 62 of the front 38 or body 47. The edge 62 bounds the body 47. The pressure sensor element 60 is part of a sensor-alarm circuit 64 that includes a piezo-sounder 66, which is an audible alarm. It is in electrical communication with a battery 68. The battery 68 and piezo-sounder 66 are housed in the interior 48. The LED light 22 is also in electrical communication with the battery 68. It indicates that the device 10 is working. The combination of the piezo-sounder 66 and the pressure sensitive element 60 is referred to as a pressure sensitive audible alarm mechanism.

Figure 4:
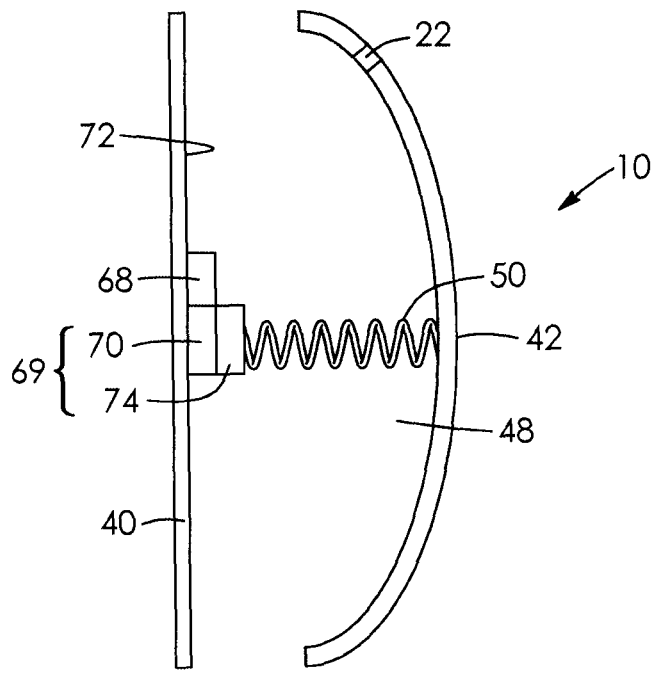
FIG. 4 is a longitudinal sectional view of an alternative embodiment of the audible alarm mechanism of the technology of FIG. 1.

As shown in FIG. 4, in another embodiment, the pressure sensitive audible alarm mechanism, generally referred to as 69 has an audible alarm 70 and a pressure activated switch 74. The pressure activated switch 74 is mounted on an inner surface 72 of the interior 48, (which may be the inner surface of the back 40). The pressure activated switch 74 is attached to the spring 50 and abuts the audible alarm 70. The alarm 70 is in electrical communication with at least one battery 68, also housed in the interior 48. The LED light 22 is also in electrical communication with the battery 68. It indicates that the device 10 is working.

Figure 5:
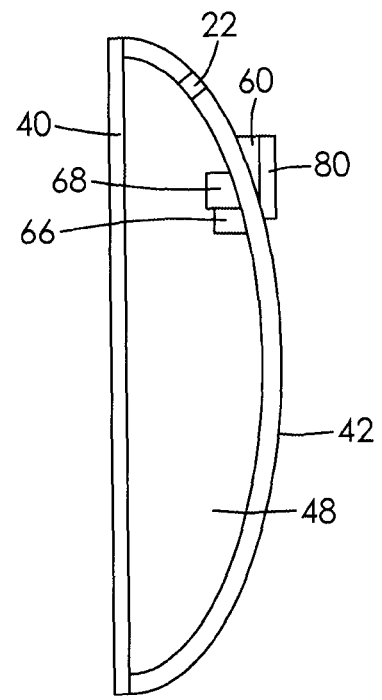
FIG. 5 is a longitudinal sectional view of yet another alternative embodiment of the audible alarm mechanisms of the technology of FIG. 1.

As shown in FIG. 5, in yet another embodiment, the pressure sensor element 60, which is preferably the piezo-ceramic wafer, is located at the front 38 of the device 10. This embodiment does not require a spring or other biasing member. The pressure sensor element 60 is preferably mounted on the front, so that a user can easily contact the pressure sensor element 60. To further aid a user in contacting the pressure sensor element 60, it may be housed in a coloured button 80 that is made of a resilient material with sufficient flexibility that it gives under the pressure of a user's hand or finger. This button 80 is preferably mounted directly on the front 38. For aesthetics, the remainder of the sensor-alarm circuit 64 and the battery 68 are housed within the interior 48. The combination of the piezo-sounder 66 and the pressure sensitive element 60 is referred to as a pressure sensitive audible alarm mechanism.

Figure 6:
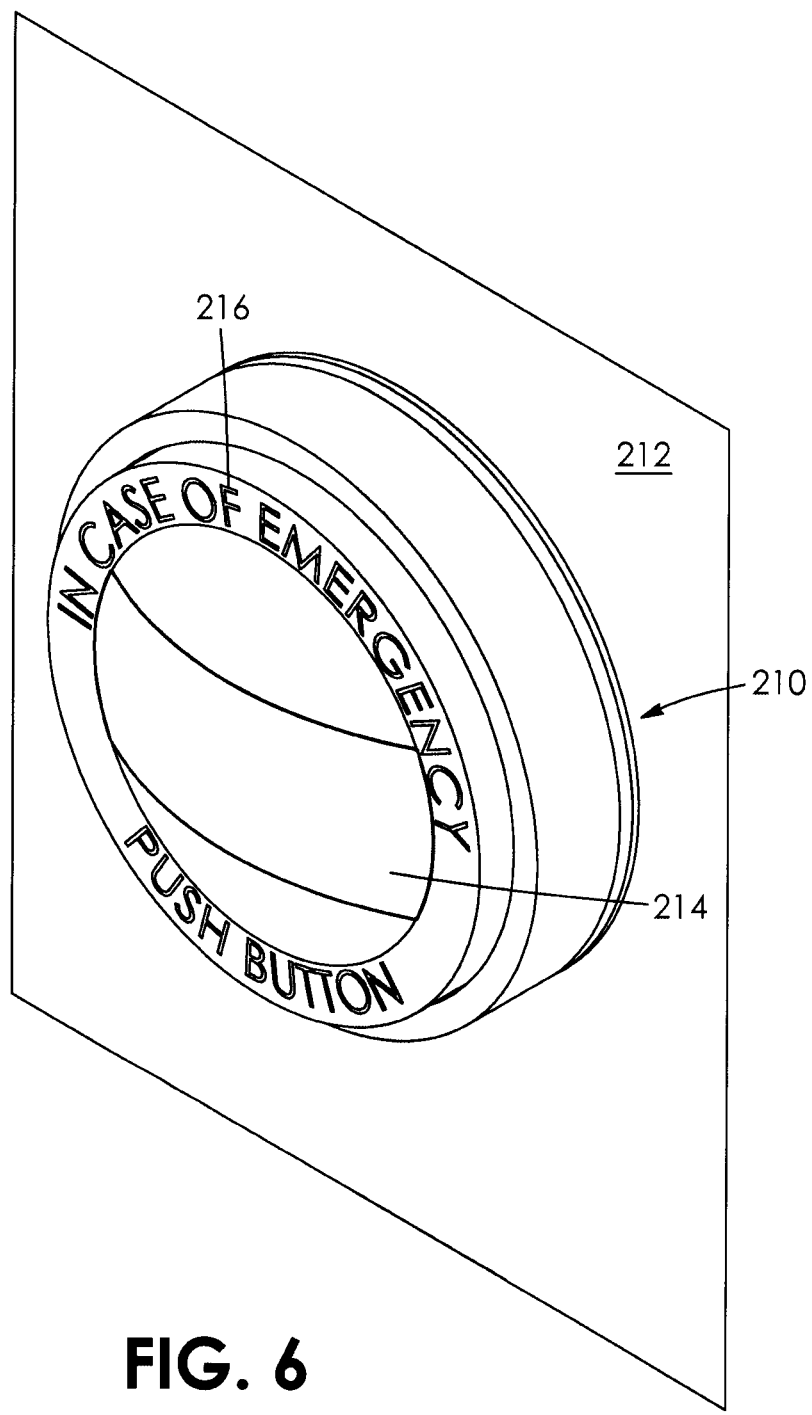
FIG. 6 is a perspective view of an alternative embodiment of the present technology.

As shown in FIG. 6, in the preferred embodiment, the device 210 is circular, and is mounted on a surface, such as a wall 212. It has a mirrored surface 214 which is a partial convex mirror. Around the mirror is a red surface with a sign 116 that indicates "IN CASE OF EMERGENCY PUSH BUTTON".

Figure 7:
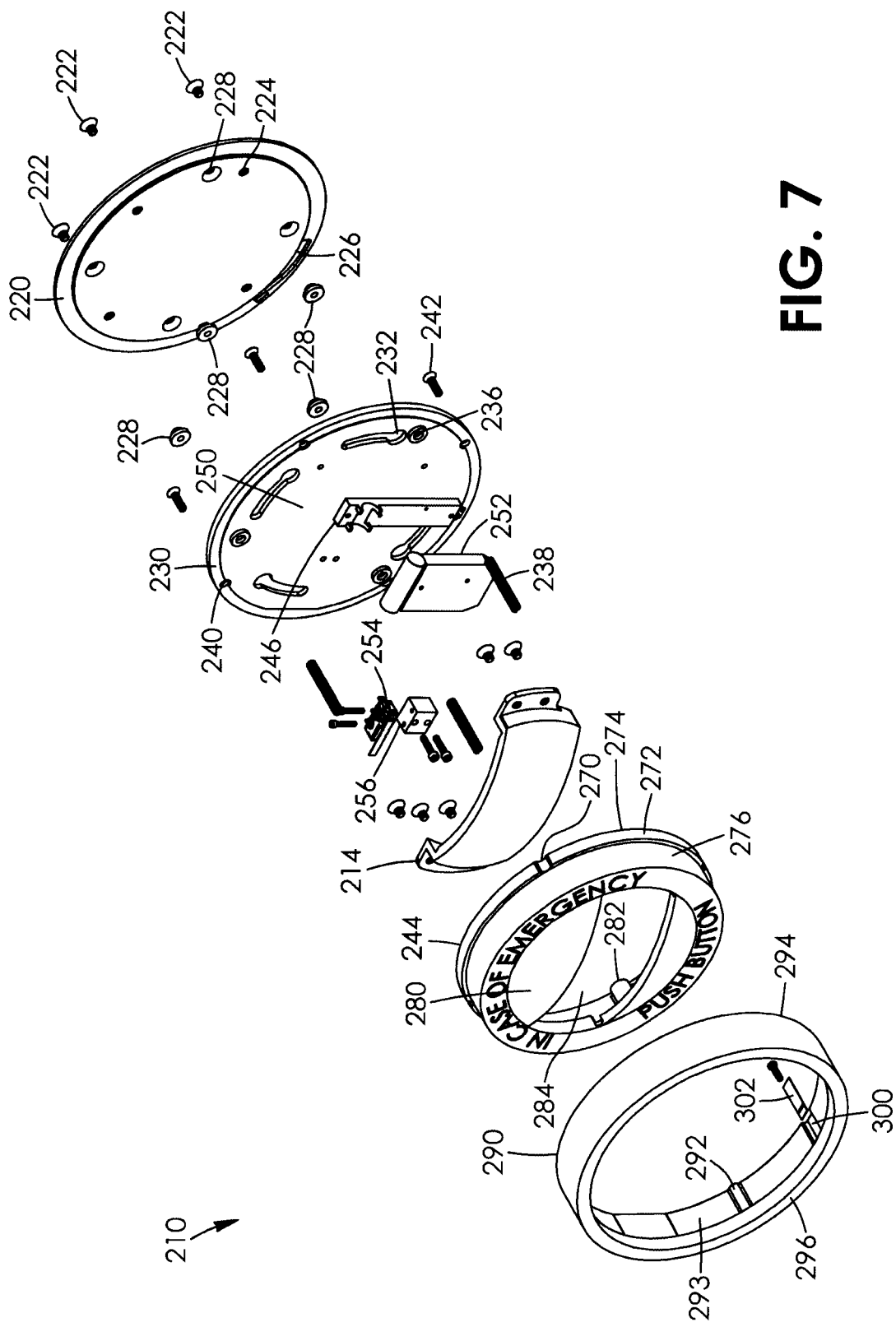
FIG. 7 is an exploded view of the device of FIG. 6.

As shown in FIG. 7, the device 210 has a wall mount plate 220 that attaches to the surface 212 with four screws 222 that extends through four wall mount plate apertures 224. A spring-steel locking tab slot 226 is located proximate the periphery of the wall mount plate 220. Four twist lock protrusions 228 extend towards a backing plate 230.

The backing plate 230 has four twist lock slots 232 that releasably mate with the twist lock protrusions 228. Three compression spring retaining members 236 extend towards the front of the device for retaining three compression springs 238. Each retaining member 236 includes a bore that the compression spring 238 sits in. Four apertures 240 are located proximate the periphery of the backing plate 230 and are for accepting four screws 242 that attach the pressure sensitive circuitry to the backing plate 230.

A battery holder 246 is attached to the front side 250 of the backing plate 230. A remote alarm printed circuit board 252 and a limit switch 254 are also attached to the front side 250 of the backing plate 230 and are in electronic communication with one another and are in electrical communication with the battery. The limit switch 254 is held in place with a microswitch mount 256.

The button shell 244 has a series of grooves 270 extending from the front 272 to the back 274 on the outer surface of the side wall 276. The button shell 244 is slidably housed in the exterior ring 290. It has three compression spring retaining members 282 extending towards the back of the device for retaining the three compression springs 238. The compression springs 238 are housed in a bore of the retaining members 282. The compression springs 238 are selected to allow the button 280 to contact the limit switch 254 when it is pushed, and to be urged away from the limit switch 254 when not pushed. The button 280 is red and has a sign 216 around the periphery. The convex mirror 214 fits in a slot 284 in the button 280 and is attached to or integral with the button 280. The button 280 and the button shell 244 are a single unit body.

The exterior ring 290 has a series of ridges 292 on the inner surface 293 extending from the back 294 towards the front 296 that are engaged by the grooves 270 of the button shell 244. The exterior ring slidably engages the button shell 244, hence the grooves and ridges retain the button shell in alignment. The button shell 244, and therefore the button 280 extend outward into the ambient from the exterior ring 290. A spring steel locking tab pass through 300 is also located on the inner surface 293. The spring steel tab 302 is engaged in the pass through 300 at one end and in the spring steel locking tab slot 226 of the wall mounting plate 220. Releasing the tab allows the exterior ring 290 to be released, thereby releasing the button 280 with its button shell 244, which allows access to the interior for replacing the battery. This also allows for the backing plate 230 to be removed from the wall mount plate 220.

The device communicates wirelessly with a remote alarm when the button 280 is depressed.

Figure 8:
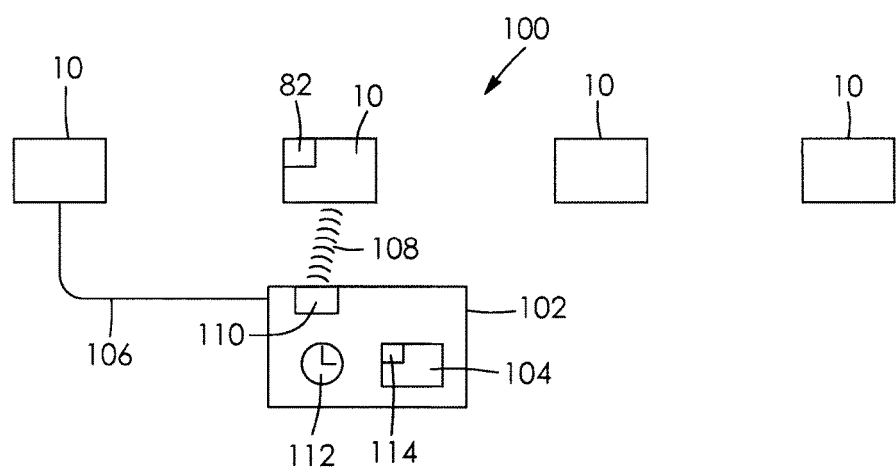
FIG. 8 is a schematic of the system of the present technology.

As shown in FIG. 8, the device 10, 210 can be part of a security system, generally referred to as 100, which may include multiple devices 10. A processor 102 that receives instructions from a memory 104 is in electronic communication with the device 10. The communication between the device 10 and the processor 102 is via one or more of hard wired 106, Bluetooth 108 (in which case the device 10 is provided with a Bluetooth radio, shown as 82, and the processor 102 is further in electronic communication with a receiving Bluetooth radio 110), or other modes of electronic communication, as would be known to one skilled in the art. The processor 102 includes a clock 112 and the memory 104 includes a map 114 of the location of the devices 10.

Figure 9:
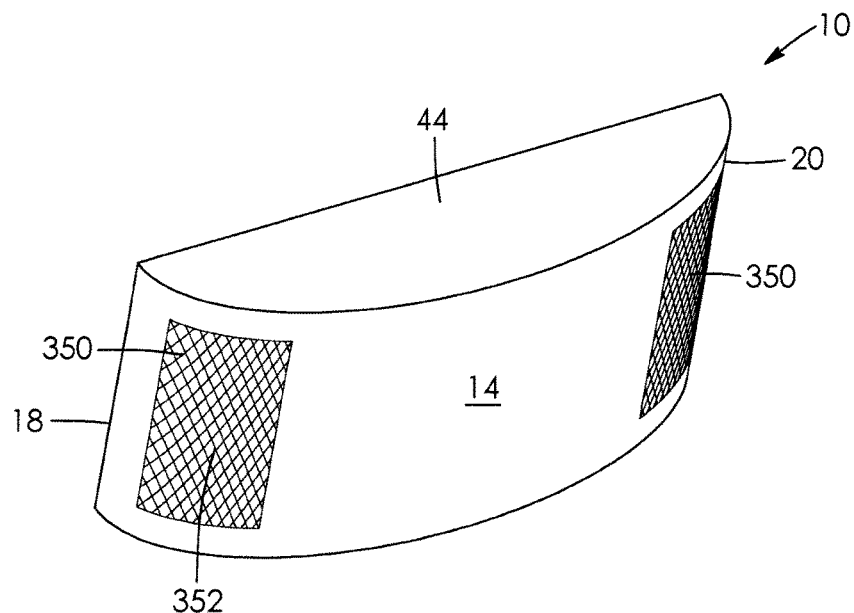
FIG. 9 is an alternative embodiment of the device of FIG. 1.

As shown in FIG. 9 in an alternative embodiment, the plurality of apertures is replaced with one aperture 350 proximate each side 18, 20 with screening 352 over the apertures 350.

Figure 10:
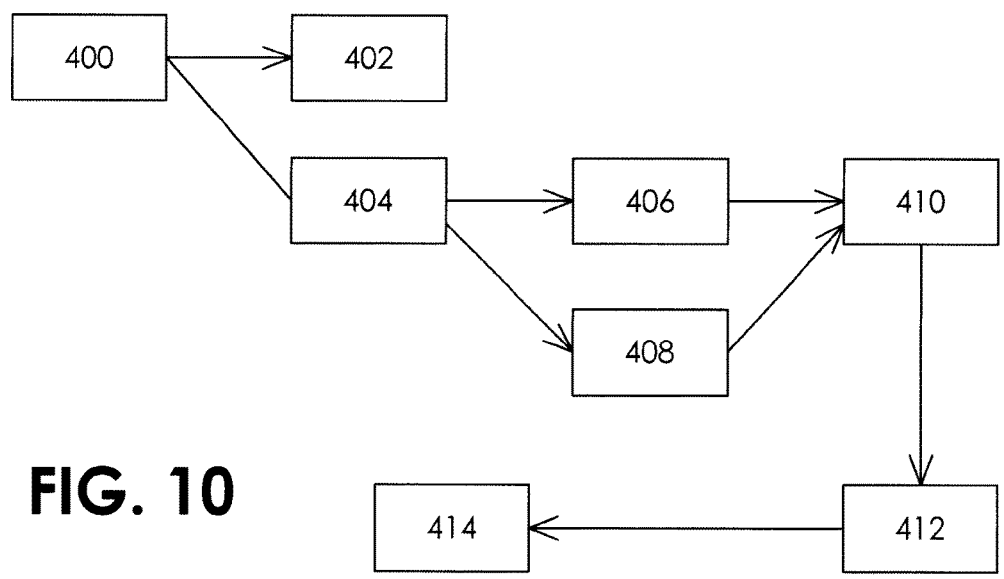
FIG. 10 is a schematic of the method of notifying a central processor and reporting an event with the processor.

A method of using the system is shown in FIG. 10. A user depresses 400 the front of the device or the button, causing an audible alarm to sound 402. Concomitantly, a signal is sent 404 to the central processor. The time of the event is recorded 406 and the location of the event is recorded 408. Security personnel can be notified 410 of the event. The location and time of the event are stored 412 in the memory. Subsequent reviewing and analysing 414 of the data allow determination of problem locations and problem times. This can be used for planning purposes or to make changes to the location, or to ensure that there is a higher level of security offered in the locations and at the times that are shown to be more dangerous.

In an alternative embodiment, the device is hard wired rather than including a battery.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A personal security device for mounting on a surface and for use with a power supply, the device comprising: i) a body, the body including: an exterior ring; a button, which includes a reflective convex surface on at least a portion of the button; and a button shell, the button shell in slidable engagement with the exterior ring; a backing plate, the backing plate abutting the exterior ring; and a wall mount plate, which is releasably attached to both the backing plate and the exterior ring; ii) an interior, which is defined by the button and the backing plate, the interior including a first inner surface defined by the backing plate and a second inner surface defined by the button; iii) at least one biasing member, which extends between the first inner surface and the second inner surface; iv) a pressure sensitive audible alarm mechanism, the alarm mechanism including a pressure sensor, the pressure sensor located in the interior, a distance from the button, which is biased from the pressure sensor with the biasing member; and v) an audible alarm, the audible alarm in communication with the pressure sensor.

2. The device of claim 1, wherein the audible alarm is remote to the body and is in wireless communication with the pressure sensor.

3. The device of claim 1, wherein the audible alarm is housed in the interior and the device further comprises a plurality of sound apertures.

4. The device of claim 3, wherein the pressure sensitive audible alarm mechanism is a sensor-alarm circuit that includes a piezo-sensor and a piezo-sounder, the piezo-sensor in electrical communication with the piezo-sounder.

5. The device of claim 4, wherein the backing plate includes at least two twist lock slots and the wall mount includes at least two twist lock protrusions, the twist lock protrusions in releasable engagement with the twist lock slots.

6. The device of claim 5, further comprising a tab, the tab releasably retained in the exterior ring and retained in the wall mount to releasably retain the exterior ring and the button.

7. A security system for monitoring personal safety of users, the system comprising: i) a plurality of personal safety devices, the personal safety devices each including: a) a body, the body including a button, which includes a reflective convex surface on at least a portion of the button, a back, a sidewall between the button and the back, the button in slidable engagement with the sidewall and biased from the back and a wall mount plate, which is releasably attached to both the back and the sidewall; b) an interior, which is defined by the button, the back and the sidewall; c) a sensor-alarm circuit, the sensor alarm circuit housed in the interior and including a pressure sensor which is a distance from the button; ii) a remote processor with a memory; and iii) electronic or radio communication channels between the processor and the sensor-alarm circuit.

8. The system of claim 7, wherein the memory includes a map for locating a site of an activated alarm.

9. The system of claim 8, wherein the processor includes a clock for determining a time of an alarm activation.

10. A use of the device of claim 1 for personal protection.

11. A method of protecting a person, the method comprising using the system of claim 7.

12. The method of claim 11, further comprising storing data on a location and a time of activation of an alarm.

13. The method of claim 12, further comprising analyzing data to determine problem times and problem locations.

14. A personal security device for mounting on a surface and for use with a power supply, the device comprising: a body, the body including a button, which includes a reflective convex surface on at least a portion of the button, a back and a side wall, the sidewall between the button and the back, the button biased from the back and slidably engaged in the side wall; an interior defined by the button, the back and the sidewall; a pressure sensor, the pressure sensor located in the interior, a distance from the button; and an audible alarm, the audible alarm in communication with the pressure sensor.

* * * * *